W. J. DONALDSON.
STOVE-PIPE THIMBLES.
No. 194,338.      Patented Aug. 21, 1877.
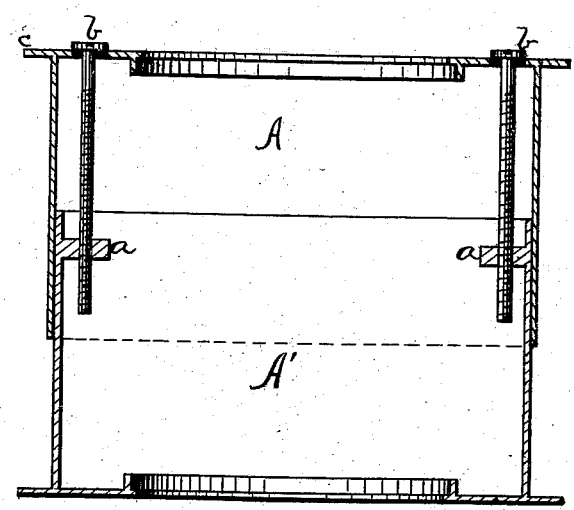
Witnesses:
T. H. Parsons.
J. R. Drake
W. J. Donaldson
Inventor, By
J. R. Drake
Atty.

UNITED STATES PATENT OFFICE.

WILLIAM J. DONALDSON, OF BUFFALO, NEW YORK.

IMPROVEMENT IN STOVE-PIPE THIMBLES.

Specification forming part of Letters Patent No. 194,338, dated August 21, 1877; application filed July 19, 1877.

*To all whom it may concern:*

Be it known that I, WILLIAM JOHN DONALDSON, of Buffalo, in the county of Erie and State of New York, have invented certain new and useful Improvements in Stove-Pipe Thimbles, of which the following is a specification:

The invention relates to telescopic thimbles; and the invention consists in the method of making them adjustable to any length desired for use, as hereinafter described.

In the drawing, the figure represents a cross-sectional view of a telescopic thimble.

A A' represent the two cylinders of the thimble, one part setting in the other. Near the top, inside the inner cylinder A', I attach lugs $a\ a$, one each side, through which long screw-rods $b\ b$ work. The heads of these screw-rods come through holes in the ventilating-rim $c$ of the outer cylinder A, and adjust the thimble to the width of any wall or depth of any floor.

By turning the screw-rods with the fingers or a screw-driver the cylinders will be lengthened or shortened so as to suit the requirements of the floor or wall for which the thimble may be intended.

The heads of these adjusting-screws $b$ will set in countersank openings in the metal rim $c$, so as to be flush with it.

The only other adjusting arrangement I am acquainted with is that with a screw-thread or spiral in the two cylinders, but which are apt to stick together.

What I claim is—

The combination of the two cylinders A A', the latter having lugs $a\ a$, with the adjusting-screws $b\ b$, passing through the cylinder A and the lugs $a\ a$, substantially as and for the purpose described.

In testimony whereof I have hereunto signed my name in the presence of two subscribing witnesses.

WM. J. DONALDSON.

Witnesses:
J. R. DRAKE,
T. H. PARSONS.